(12) United States Patent  (10) Patent No.: US 8,902,217 B2
Sugama  (45) Date of Patent: Dec. 2, 2014

(54) IMAGE GENERATING METHOD

(75) Inventor: Yasushi Sugama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 524 days.

(21) Appl. No.: 13/041,588

(22) Filed: Mar. 7, 2011

(65) Prior Publication Data

US 2011/0227912 A1 Sep. 22, 2011

(30) Foreign Application Priority Data

Mar. 17, 2010 (JP) .................................. 2010-061519

(51) Int. Cl.
G06T 15/00 (2011.01)
G06T 15/20 (2011.01)
H04N 13/02 (2006.01)

(52) U.S. Cl.
CPC ............ G06T 15/20 (2013.01); H04N 13/0275 (2013.01)
USPC .......................................... 345/419; 345/422

(58) Field of Classification Search
CPC ................................................. H04N 13/0011
USPC ................................................. 345/419, 422
See application file for complete search history.

(56) References Cited

U.S. PATENT DOCUMENTS

| | | | |
|---|---|---|---|
| 2002/0001045 A1* | 1/2002 | Ranganath et al. | 349/11 |
| 2004/0004615 A1* | 1/2004 | Hiraga et al. | 345/419 |
| 2007/0030342 A1* | 2/2007 | Wilburn et al. | 348/47 |
| 2007/0053551 A1* | 3/2007 | Kubo et al. | 382/106 |
| 2009/0219383 A1* | 9/2009 | Passmore | 348/44 |
| 2010/0060719 A1* | 3/2010 | Watanabe | 348/47 |

FOREIGN PATENT DOCUMENTS

| | | |
|---|---|---|
| JP | 7-239952 A | 9/1995 |
| JP | 10-83465 A | 3/1998 |
| JP | 2006-211386 A | 8/2006 |

OTHER PUBLICATIONS

Kim, Seok-Hoon et al., "A 36fps SXGA 3D Display Processor with a Programmable 3D Graphics Rendering Engine", IEEE International Solid-State Circuits Conference, Feb. 13, 2007, pp. 276-277.
Japanese Office Action mailed Aug. 27, 2013 for corresponding Japanese Application No. 2010-061519, with Partial English-language Translation.

* cited by examiner

*Primary Examiner* — Maurice L McDowell, Jr.
*Assistant Examiner* — Kyle Zhai
(74) *Attorney, Agent, or Firm* — Fujitsu Patent Center

(57) ABSTRACT

An image generating method includes: generating first and second projected two-dimensional images of a front object seen from first and second viewpoints, the front object being a part of the three-dimensional image divided by a predetermined boundary surface; interpolating the first and second projected two-dimensional images to generate a first interpolated two-dimensional image of the front object seen from a third viewpoint locating on a straight line connecting the first and second viewpoint; generating third and fourth projected two-dimensional images of a rear object seen from the first and second viewpoints, the rear object being another part of the three-dimensional image divided by the predetermined boundary surface; interpolating the third and fourth projected two-dimensional images to generate a second interpolated two-dimensional image of the rear object seen from the third viewpoint; and overwriting the first interpolated two-dimensional image on the second interpolated two-dimensional image.

8 Claims, 8 Drawing Sheets

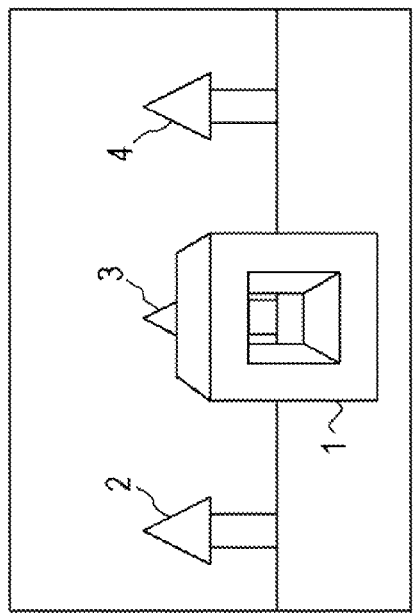
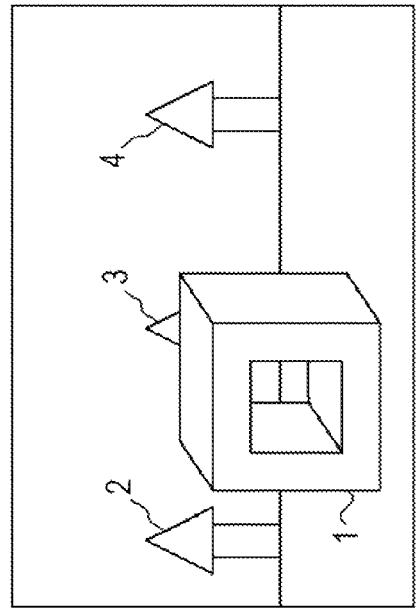
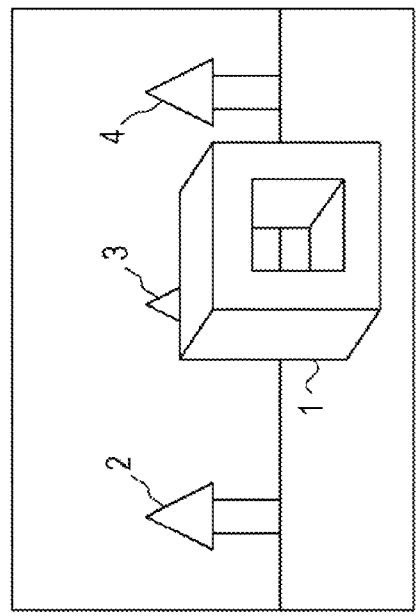

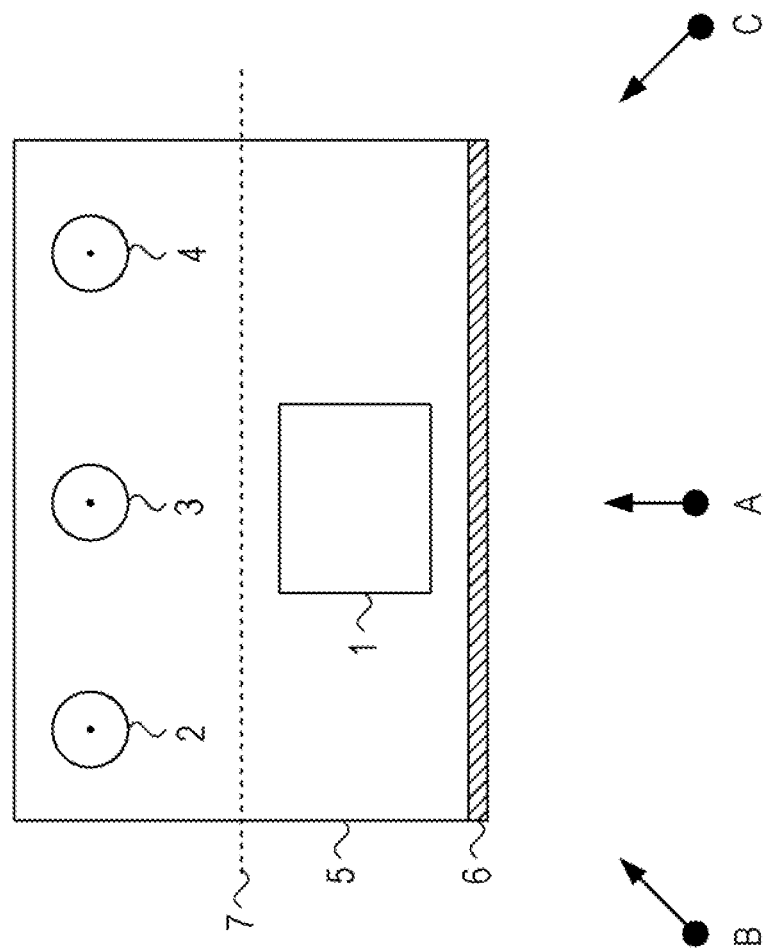

IMAGE GENERATING METHOD

CROSS-REFERENCE TO RELATED APPLICATION

This application is based upon and claims the benefit of priority of the prior Japanese Patent Application No. 2010-061519 filed on Mar. 17, 2010, the entire contents of which are incorporated herein by reference.

FIELD

The embodiments discussed herein are related to a technique for generating a two-dimensional image from a three-dimensional solid image.

BACKGROUND

In the case that a solid image that has been prepared on the basis of the three-dimensional coordinate system is to be displayed on a two-dimensional image display device such as an analog display, the solid image is projected onto a display screen of the image display device from one viewpoint as a reference.

The solid image is displayed on the display screen in the form of polygons or a wire frame. In the case that the solid image is displayed in the form of polygons, the solid image is formed by a plurality of polygons such as triangles or the like. In order to project the solid image onto the display screen, coordinates of vertexes of each polygon of the three-dimensional coordinate system are transformed to those of a polygonal two-dimensional plane. After transformed, each polygonal plane is painted out by being subjected to a shading process, a texture mapping process, luminance processing and the like. A solid image which has been projected onto the display screen from a certain viewpoint may be correctly generated by writing pixels over one another in order in which a pixel which is positioned distant from the viewpoint is written earlier than others.

A lenticular display is available as an image display device which is configured to display a solid image which has been projected from a plurality of viewpoints, in contrast to the analog display that displays the solid image which has been projected from one viewpoint. The lenticular display is configured to display a solid image in such a manner that its form changes as the viewpoint is shifted by generating two-dimensional images obtained by projecting one solid image from a plurality of viewpoints and compositing the plurality of generated two-dimensional images with one another.

In the case that a process of projecting an image onto a display screen is executed by setting a plurality of viewpoints which are arranged in a line, the more the number of viewpoints is increased, the more the throughput is increased. A technique for generating two-dimensional images which have been projected onto a display screen from a plurality of viewpoints by interpolation arithmetic processing executed using two-dimensional images which have been projected onto the display screen from two viewpoints is proposed as disclosed, for example, in "A 36 fps SXGA 3D Display Processor with a Programmable 3D Graphics Rendering Engine", Seok-Hoon Kim et al, IEEE International Solid-State Circuits Conference, 2007, pp. 276-277, 2007.

SUMMARY

According to an aspect of the embodiment, an image generating method includes: generating first and second projected two-dimensional images of a front object seen from first and second viewpoints, the front object being a part of the three-dimensional image divided by a predetermined boundary surface; interpolating the first and second projected two-dimensional images to generate a first interpolated two-dimensional image of the front object seen from a third viewpoint locating on a straight line connecting the first and second viewpoint; generating third and fourth projected two-dimensional images of a rear object seen from the first and second viewpoints, the rear object being another part of the three-dimensional image divided by the predetermined boundary surface; interpolating the third and fourth projected two-dimensional images to generate a second interpolated two-dimensional image of the rear object seen from the third viewpoint; and overwriting the first interpolated two-dimensional image on the second interpolated two-dimensional image.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1A is a diagram illustrating an example of a two-dimensional image of a solid image which has been projected onto a display screen from one of a plurality of viewpoints;

FIG. 1B is a diagram illustrating an example of a two-dimensional image of the solid image which has been projected onto a display screen from another viewpoint;

FIG. 1C is a diagram illustrating an example of a two-dimensional image of the solid image which has been projected onto a display screen from a further viewpoint;

FIG. 2 is a top plan view illustrating an example of a positional relation among a solid image and viewpoints;

DESCRIPTION OF EMBODIMENTS

Figure 3A:
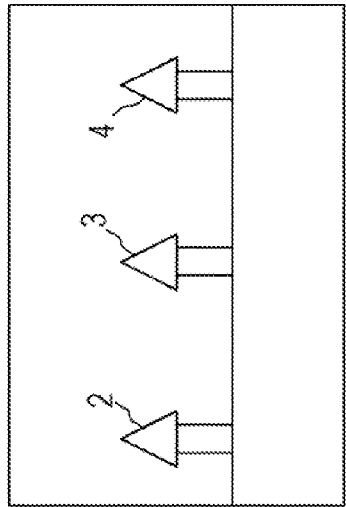
FIG. 3A is a diagram illustrating an example of an image obtained by dividing one solid image into a near view image and a distant view image and individually interpolating the images so divided.

Next, embodiments of the invention will be described. Incidentally, combinations of configurations in respective embodiments are also included in the embodiments of the invention.

FIG. 1A to FIG. 1C are diagrams illustrating examples of two-dimensional images of a solid image which has been projected onto a display screen from a plurality of viewpoints, in which FIG. 1A is a diagram illustrating an example of a two-dimensional image obtained by projecting the solid image onto the display screen from the front, FIG. 1B is a diagram illustrating an example of a two-dimensional image obtained by projecting the solid image onto the display screen from an left end viewpoint and FIG. 1C is a diagram illustrating an example of a two-dimensional image obtained by projecting the solid image onto the display screen from a right end viewpoint. Incidentally, in the examples illustrated in the drawings, the left end and the right end of the image are positions of viewpoints which are determined in accordance with a display limit of a display device that displays the image.

In FIG. 1A, a solid 1 is present in a near view when observed from the position of each viewpoint as a reference. A square through-hole is formed in the center of the solid 1. Solids 2, 3 and 4 are present in a distant view when observed from the position of each viewpoint as the reference. In the case that the solid image is observed from the front viewpoint, a part of the solid 3 which is present in the distant view is observed through the hole in the solid 1. In the examples illustrated in the drawings, the near view is information on an image which is present in the front of a position for which a threshold value is set in advance using a display screen as a reference surface and the distant view is information on an image which is present at the rear of the position for which the threshold value is set in advance using the display screen as the reference.

When the solid image is observed from the left end viewpoint as illustrated in the example in FIG. 1B, the solid 3 is not observed through the hole formed in the center of the solid 1. Thus, data on a part of the solid 3 is not included in a two-dimensional image obtained by projecting the solid image onto the display screen from the left end viewpoint.

When the solid image is observed from the right end viewpoint as illustrated in the example in FIG. 1C, the solid 3 is not observed through the hole formed in the center of the solid 1. Thus, data on a part of the solid 3 is not included in a two-dimensional image obtained by projecting the solid image onto the display screen from the right end viewpoint.

Therefore, if an interpolated image observed at the front viewpoint of the solid 1 is generated from the two-dimensional image in FIG. 1B and the two-dimensional image in FIG. 1C, an inaccurate two-dimensional image in which the solid 3 is not observed through the hole in the center of the solid 1 will be generated.

In the case that an image is projected onto the display screen from the left end viewpoint and the right end viewpoint, an accurate two-dimensional image which is observed from an arbitrary viewpoint may be generated by interpolation by avoiding such a situation that a part which will be in the dead angle from both of the left end and right end viewpoints is generated.

FIG. 2 is a top plan view illustrating an example of a positional relation among a solid image and viewpoints. In the drawing, the solids 1, 2, 3 and 4 are pieces of three-dimensional image information disposed in a three-dimensional space 5. These pieces of three-dimensional image information are stored in a storage which will be described later. A display screen 6 is a two-dimensional plane onto which the solids 1, 2, 3 and 4 are projected from viewpoints A, B and C as references. A boundary surface 7 is a boundary surface along which the solids 1, 2, 3 and 4 which are in the three-dimensional space 5 are divided into two groups of the solid 1 in the near view and to the solids 2, 3 and 4 in the distant view. The boundary surface 7 is disposed in parallel with the display screen 6.

The viewpoints A, B and C indicate viewpoint coordinate positions virtually located on the same coordinate system as that of the three-dimensional space 5. The viewpoints A, B and C are arranged in al line. The viewpoint A indicates the position at which the display screen 6 is observed from the front and corresponds to the scene in FIG. 1A. The viewpoint B indicates the position at which the display screen 6 is observed from the left end and corresponds to the scene in FIG. 1B. The viewpoint C indicates the position at which the display screen 6 is observed from the right end and corresponds to the scene in FIG. 1C.

The coordinate system of the solids 1, 2, 3 and 4 is transformed to the two-dimensional coordinate system using the viewpoints A, B and C as references to project two-dimensional images obtained by observing the solids 1, 2, 3 and 4 from the respective viewpoints A, B and C onto the display screen 6.

In this embodiment, an image generator generates near view two-dimensional images which are obtained at the left end viewpoint B and the right end viewpoint C on the basis of the solid 1 which indicates the image information positioned in the front of the boundary surface 7 in the three-dimensional image information stored in the storage. Then, the image generator generates by interpolation a two-dimensional image of the solid 1 which is observed at the front viewpoint A as a reference on the basis of the near view two-dimensional images so generated. Then, the image generator generates distant view two-dimensional images which are observed at the left end viewpoint B and the right end viewpoint C on the basis of the solids 2, 3 and 4 which indicate the image information positioned at the rear of the boundary surface 7. The image generator generates by interpolation a distant view two-dimensional image which is observed at the front viewpoint A as a reference on the basis of the distant view two-dimensional images so generated. Then the image generator composites the near view and distant view two-dimensional images so generated by interpolation each other on the basis of distances of these images from the boundary surface 7.

Owing to execution of the above mentioned processing, regardless of presence of a part which will be in the dead angle when observed from both of two viewpoints, the image generator is allowed to generate a two-dimensional image which has been projected onto the display screen from a viewpoint other than the above two viewpoints with accuracy by interpolation arithmetic processing executed using two-dimensional images which have been projected from the above two viewpoints.

Figure 3B:
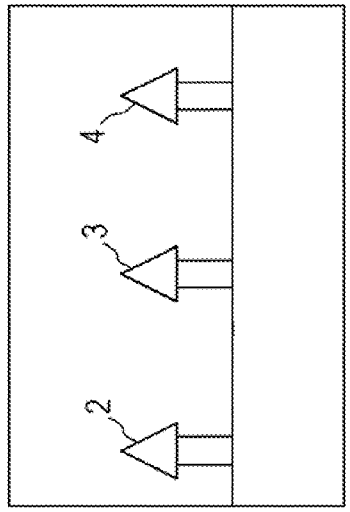
FIG. 3B is a diagram illustrating an example of an image obtained by dividing one solid image into a near view image and a distant view image and individually interpolating the images so divided.
Figure 3C:
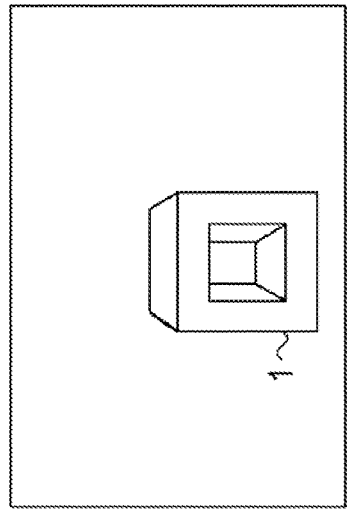
FIG. 3C is a diagram illustrating an example of an image obtained by dividing one solid image into a near view image and a distant view image and individually interpolating the images so divided.
Figure 3D:
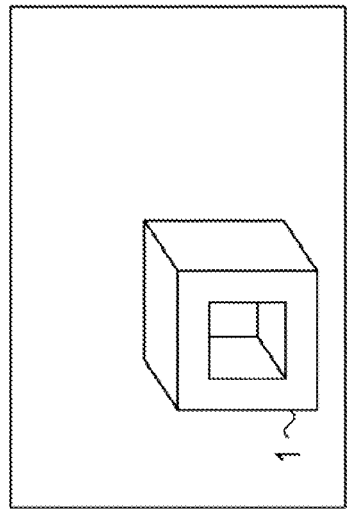
FIG. 3D is a diagram illustrating an example of an image obtained by partitioning one solid image into a near view image and a distant view image and individually interpolating the images so divided.
Figure 3E:
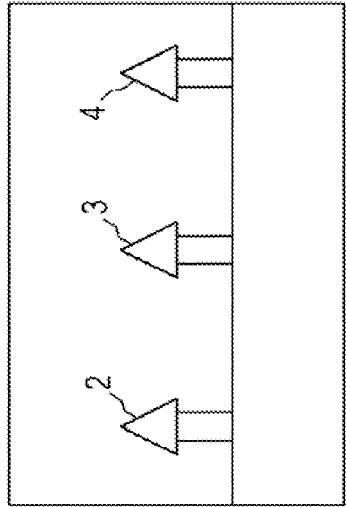
FIG. 3E is a diagram illustrating an example of an image obtained by dividing one solid image into a near view image and a distant view image and individually interpolating the images so divided.
Figure 3F:
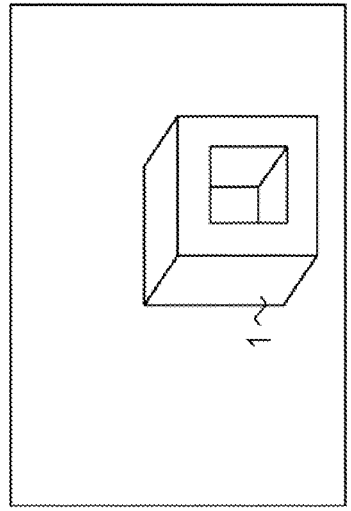
FIG. 3F is a diagram illustrating an example of an image obtained by dividing one solid image into a near view image and a distant view image and individually interpolating the images so divided.

FIG. 3A to FIG. 3F are diagrams illustrating examples of separate interpolation of images in the distant view and the near view. FIG. 3A to FIG. 3C are diagrams illustrating examples of interpolation of images in the distant view. FIG. 3D to FIG. 3F are diagrams illustrating examples of interpolation of images in the near view.

FIG. 3A illustrates an example of a two-dimensional image obtained by projecting a three-dimensional image of a solid image from which the solid 1 in the near view has been deleted onto the display screen from the left end viewpoint. Each piece of vertex information on each of vertexes of polygons included in the two-dimensional image which has been projected onto the display screen includes depth information corresponding to the distance of each vertex measured from the display screen. Deletion of the solid 1 allows projection of the entire of the solid 3 onto the display screen. The depth information may be information on the distance of each vertex measured from the boundary surface along which a solid image is divided into near view image and distant view image. Owing to preparation of the depth information as the vertex information, an accurate two-dimensional image in which the distance of the image measured from each viewpoint is taken into consideration may be generated by separately generating near view and distant view two-dimensional images by execution of interpolation arithmetic processing and then compositing these two-dimensional images with each other on the basis of the depth information of each vertex.

FIG. 3B illustrates an example of a two-dimensional image obtained by projecting a three-dimensional image in which the solid 1 in the near view has been deleted from the solid image onto the display screen from the right end viewpoint. Each piece of vertex information of each of vertexes of polygons included in the two-dimensional image which has been projected onto the display screen includes depth information corresponding to its distance measured from the display screen. Deletion of the solid 1 allows projection of the entire of the solid 3 onto the display screen.

FIG. 3C illustrates an example of a two-dimensional image which is obtained by performing interpolation on the basis of the two-dimensional images illustrated in FIG. 3A and FIG. 3B and by projecting the solid image onto the display screen from the front viewpoint. Depth information of each of vertexes of polygons included in the two-dimensional image obtained by interpolation is obtained by performing interpolation arithmetic processing on the depth information of each of vertexes of polygons included in the original two-dimensional image. Deletion of the solid 1 allows accurate generation of an interpolated two-dimensional image of the solid 3.

FIG. 3D illustrates an example of a two-dimensional image obtained by projecting the three-dimensional image of the solid 1 which has been deleted from the image illustrated in FIG. 3A onto the display screen from the left end viewpoint. FIG. 3E illustrates an example of a two-dimensional image obtained by projecting the three-dimensional image of the solid 1 which has been deleted from the image in FIG. 3B onto the display screen from the right end viewpoint. Each piece of vertex information on each of vertexes of polygons included in the two-dimensional image which has been projected onto the display screen includes depth information corresponding to its distance measured from the display screen. FIG. 3F illustrates an example of a two-dimensional image which is obtained by performing interpolation on the basis of the two-dimensional images in FIG. 3D and FIG. 3E and by projecting the solid 1 onto the display screen from the front viewpoint. Depth information on each of vertexes of polygons included in the two-dimensional image obtained by interpolation is obtained by performing interpolation arithmetic processing on depth information on each of vertexes of polygons included in the original two-dimensional image.

Each of vertexes of polygons included in the interpolated two-dimensional images in FIG. 3C and FIG. 3F which have been generated by interpolation includes depth information. The two-dimensional image which has been projected onto the display screen from the front viewpoint may be generated with accuracy by execution of interpolation arithmetic processing, by drawing the image in FIG. 3F over the image in FIG. 3C on the basis of depth information included in each of vertexes of polygons included in each two-dimensional image.

As described above, a slid image is divided into distant view image and near view image, interpolated images of the distant view image and the near view image are separately generated, and then the interpolated images are composited with each other on the basis of depth information on each vertex. Owing to execution of the above mentioned processing, regardless of presence of a part which will be in the dead angle when observed from both of two viewpoints, it is allowed to generate a two-dimensional image which has been projected onto a display screen from a viewpoint other than the above two viewpoints with accuracy by interpolation arithmetic processing executed using two-dimensional images which have been projected onto the display screen from the above two viewpoints.

Figure 4:
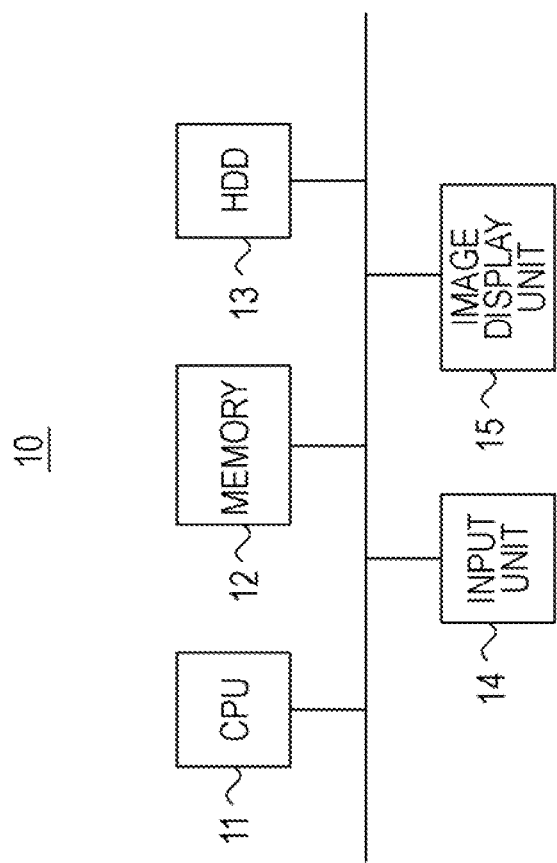
FIG. 4 is a block diagram illustrating an example of an image generator.

FIG. 4 is a block diagram illustrating an example of an image generator 10 which implements the image generating process illustrated in FIG. 3. The image generator 10 includes a CPU (Central Processing Unit) 11, a memory 12, an HDD (Hard Disk Drive) 13, an input unit 14 and an image display unit 15.

The CPU 11 is a control section that generates a two-dimensional image in the case that a solid image has been projected onto a display screen from a certain viewpoint and generates an interpolated image from a plurality of two-dimensional images. The image generator 10 may include a GPU (Graphic Processing Unit) used for arithmetic operation involving image processing in addition to the CPU.

The HDD 13 stores therein vertex information on a frame that forms a solid image as a processing object, pixel information on a texture and the like. The HDD 13 stores therein a result of arithmetic operation which is performed using the CPU 11 and is temporarily stored in the memory 12. An SSD (Solid State Drive) including a nonvolatile memory such as a flash memory or the like may be used in place of the HDD.

The memory 12 temporarily stores therein information which is to be arithmetically processed using the CPU 11 in the vertex information of the frame, the pixel information on the texture and the like stored in the HDD 13. The memory 12 temporarily stores therein a result of arithmetic processing performed using the CPU 11.

The input unit 14 is a unit through which conditions or the like of image processing are input into the image generator 10. As examples of the input unit 14, a keyboard, a mouse and the like may be given.

The image display unit 15 is a unit on which a result of execution of image processing is visually displayed. As an example of the image display unit 15, the above mentioned lenticular display may be given. An image to be output to the image display unit 15 is generated using the CPU 11. The CPU 11 generates an output image conforming to the output format of the image display unit 15.

Owing to the above mentioned configuration, the image generator 10 is allowed to generate a two-dimensional image which has been projected onto the display screen from an arbitrary viewpoint for a three-dimensional image stored in the HDD 13 in accordance with conditions which have been input into it using the input unit 14 and to visually output the generated two-dimensional image onto the image display unit 15.

Figure 5:
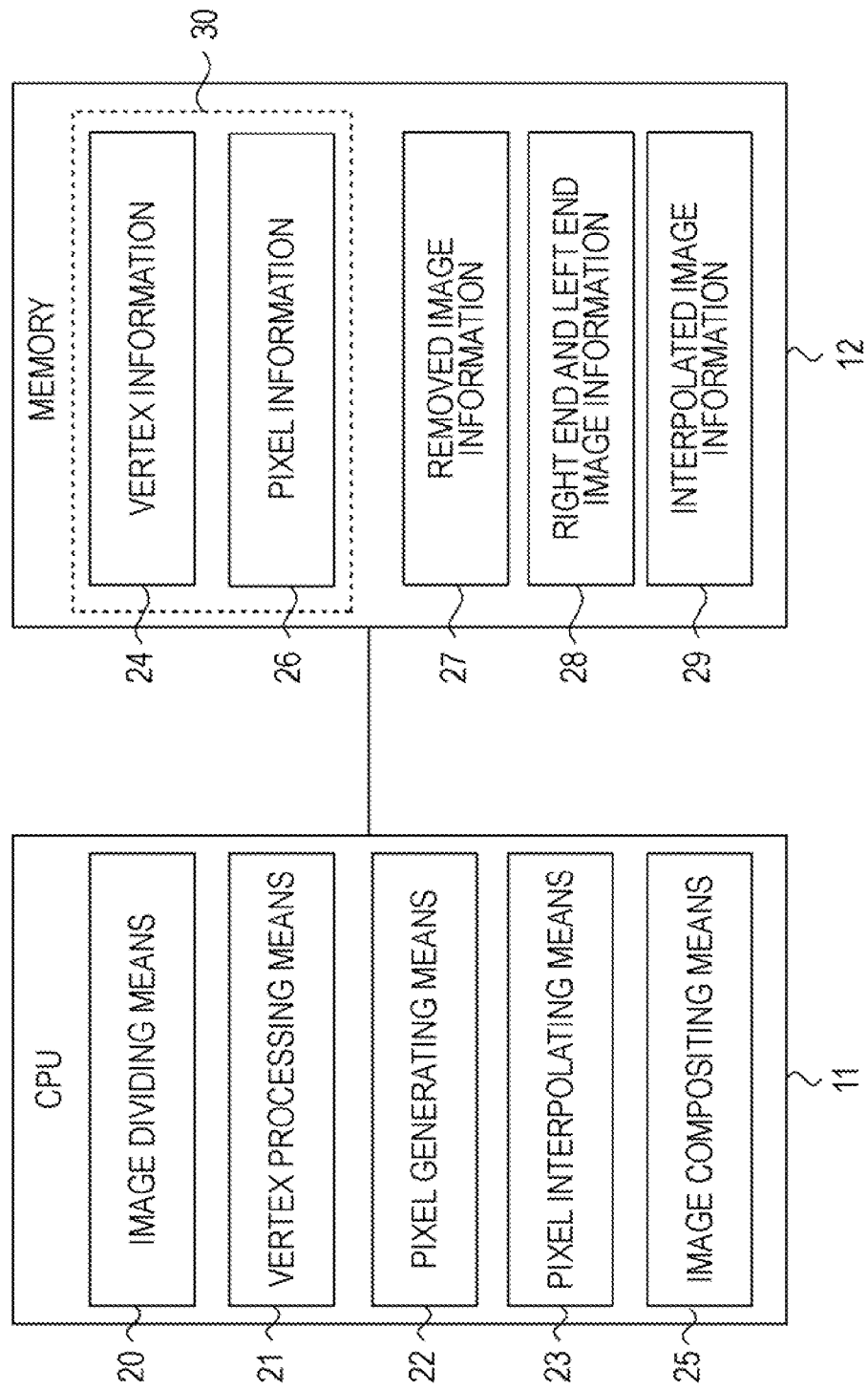
FIG. 5 is a detailed block diagram illustrating examples of a CPU and a memory.

FIG. 5 is a detailed block diagram illustrating examples of the CPU 11 and the memory 12 according to the embodiment. The CPU 11 processes data stored in the memory 12 by executing a program and outputs a result of execution of data processing to the memory 12. The program which is executed using the CPU 11 may be stored either in the memory 12 or in a memory dedicated to the CPU 11.

The CPU 11 executes image dividing means 20, vertex processing means 21, pixel generating means 22, pixel interpolating means 23 and image compositing means 25 in accordance with programs.

The image dividing means 20 divides a three-dimensional image into near view image and distant view image in accordance with a previously set threshold value. The image dividing means 20 temporarily removes the three-dimensional image in the near view or in the distant view which is an out-of-object in the three-dimensional images so divided. As an example of the threshold value, a boundary surface which is disposed in parallel with the display screen may be given.

The boundary surface which functions as the threshold value may be a plane along which vertexes of a plurality of mutually adjacent polygons included in a three-dimensional image are divided to be positioned in the front or at the rear of a boundary surface which is set on the basis of a viewpoint concerned. The CPU 11 is allowed to set the boundary surface by judging on which side of the boundary surface the vertexes of polygons included in one of a plurality of three-dimensional images are divided to be positioned.

Three-dimensional image information is defined by a plurality of polygons. Each polygon is defined by respective pieces of positional information on vertexes of the polygon. In the case that one of the vertexes of each polygon is positioned in the front of the boundary surface, the polygon may be regarded to be positioned in the front of the boundary surface, and in the case that all the vertexes of each polygon are positioned at the rear of the boundary surface, the polygon may be regarded to be positioned at the rear of the boundary surface.

Even in the case that one three-dimensional image is positioned intersecting the boundary surface, the CPU 11 is allowed to divide the three-dimensional image into image parts positioned in the front and at the rear of the boundary surface by dividing the three-dimensional image in units of polygons. Even in the case that a three-dimensional image includes a part which would be in the dead angle when observed from two viewpoints, the CPU 11 is allowed to generate a two-dimensional image which has been projected from a viewpoint other than the above two viewpoints by execution of interpolation arithmetic processing, by dividing one three-dimensional image into two parts in the vicinity of an area where the dead angle may be present.

The number of boundary surfaces need not be limited to one and a plurality of boundary surfaces may be set in accordance with the number of dead angles of each three-dimensional image. An accurate two-dimensional image may be generated by execution of interpolation arithmetic processing even from a three-dimensional image having a plurality of dead angles, by dividing the three-dimensional image into two groups of near view image and distant view image along each of all the boundary surfaces.

The vertex processing means 21 transforms the coordinates of the vertexes of polygons included in a three-dimensional image which has been judged as a processing object using the image dividing means 20 to those of the vertexes of polygons included in a two-dimensional image which has been projected onto the display screen from an arbitrary viewpoint. The vertex processing means 21 calculates the distance of each vertex measured from the display screen which is obtained upon coordinate transformation from the three-dimensional image to the two-dimensional image as depth information and writes it into the memory 12 as part of the vertex information after coordinate transformation. The vertex processing means 21 calculates the luminance of each vertex on the basis of light source information such as the position, the intensity and the like of a light source and writes it into the memory 12 as part of the vertex information.

The pixel generating means 22 allocates pixel data to each of vertexes of polygons included in the two-dimensional image which has been projected onto the display screen on the basis of the luminance calculated using the vertex processing means 21. The pixel generating means 22 calculates information on pixels which form a plane surrounded by a plurality of vertexes by executing interpolation arithmetic processing on the basis of the pixel information allocated to each vertex. The pixel generating means 22 applies a texture to each plane by performing a texture mapping process. The above mentioned pixel generating process is generally called a "rasterizing" process.

The pixel interpolating means 23 generates and outputs information on the two-dimensional image which has been projected onto the display screen from an arbitrary viewpoint by calculating interpolation on the basis of information on the two-dimensional images which have been projected onto the display screen from two viewpoints. The pixel interpolating means 23 extracts two vertexes corresponding to vertexes as interpolation objects from right end and left end image information and executes interpolation b arithmetic processing on the vertexes. The pixel interpolating means 23 executes interpolation arithmetic processing also on depth information of each vertex to calculate the depth information on each of vertexes of polygons included in the interpolated image.

The image compositing means 25 composites near view and distant view two-dimensional images which have been separately projected onto the display screen with each other on the basis of the depth information on each vertex. In the case that one of the near view and distant view images is to be projected onto another image, the image compositing means 25 may calculate again the pixel value of each two-dimensional image by taking a relation in projection between the near view and distant view images into consideration in compositing the two-dimensional images with each other.

The memory 12 includes image information 30, removed image information 27, right end and left end image information 28 and interpolated image information 29.

The image information 30 is the entire or part of image information on a three-dimensional image to be projected onto the display screen. The image information 30 includes vertex information 24 and pixel information 26. Likewise, the removed image information 27, the right end and left end image information 28 and the interpolated image information 29 include the vertex information and the pixel information as in the case in the image information 30. However, illustration thereof is omitted in FIG. 5.

The vertex information 24 is position information of vertexes of polygons included in the three-dimensional image to be projected onto the display screen. The vertex information 24 is the entire or part of the three-dimensional image information which has been read out of the HDD 13 conforming to the throughput of the CPU 11 and the storage size of the memory 12.

The pixel information 26 is vertex information of each vertex and information on pixels included in a plane surrounded by the vertexes. The pixel information 26 includes color information and luminance information of each pixel. The pixel information 26 is output using the pixel generating means 22. The pixel information 26 may include information on textures to be allocated to respective planes. Although, in this embodiment, the pixel information 26 and the vertex information 24 are defined as different pieces of information, the pixel information may be defined as part of the vertex information 24.

The removed image information 27 is image information on a part which has been excluded from processing objects in the three-dimensional image which has been divided into the near view and distant view images. The image information on the removed part may be processed by temporarily storing the image information on the part which has been excluded from the processing objects without performing again the dividing process.

The right end and left end image information 28 is information on images obtained by projecting a three-dimensional image onto the display screen from the left end and right end viewpoints. In this embodiment, the three-dimensional image to be projected onto the display screen from the right end and left end viewpoints is a three-dimensional image obtained after removing the near view or distant view image.

Each of vertexes of polygons included in the image which has been projected onto the display screen has depth information. The depth information is information on a distance from the display screen to each vertex. In the case that the three-dimensional image is projected onto the display screen, information on the viewpoint-based depth (the depth measured on the basis of each viewpoint) of each vertex is lost. In this embodiment, the near view and the distant view images are separately generated by interpolation and then are composited with each other taking the depth information into consideration and hence information on the display-screen-based depth (the depth measured on the basis of the display screen) of each vertex is stored as information on each vertex.

The interpolated image information 29 is information on an interpolated image which has been projected onto the display screen from an arbitrary viewpoint on the basis of the right end and left end image information 28. Interpolation arithmetic processing for generating the interpolated image information 29 is executed using the image interpolating means 23. The interpolated image information 29 also includes information on the depth of each vertex which has been calculated by execution of interpolation arithmetic processing.

As described above, the image generator 10 is allowed to generate, by execution of interpolation arithmetic processing using the two-dimensional images which have been projected onto the display screen from two viewpoints, the two-dimensional image which has been projected onto the display screen from a viewpoint other than the above two viewpoints with accuracy, by making the CPU 11 execute the respective means on the basis of respective pieces of information which are temporarily stored in the memory 12.

Figure 6:
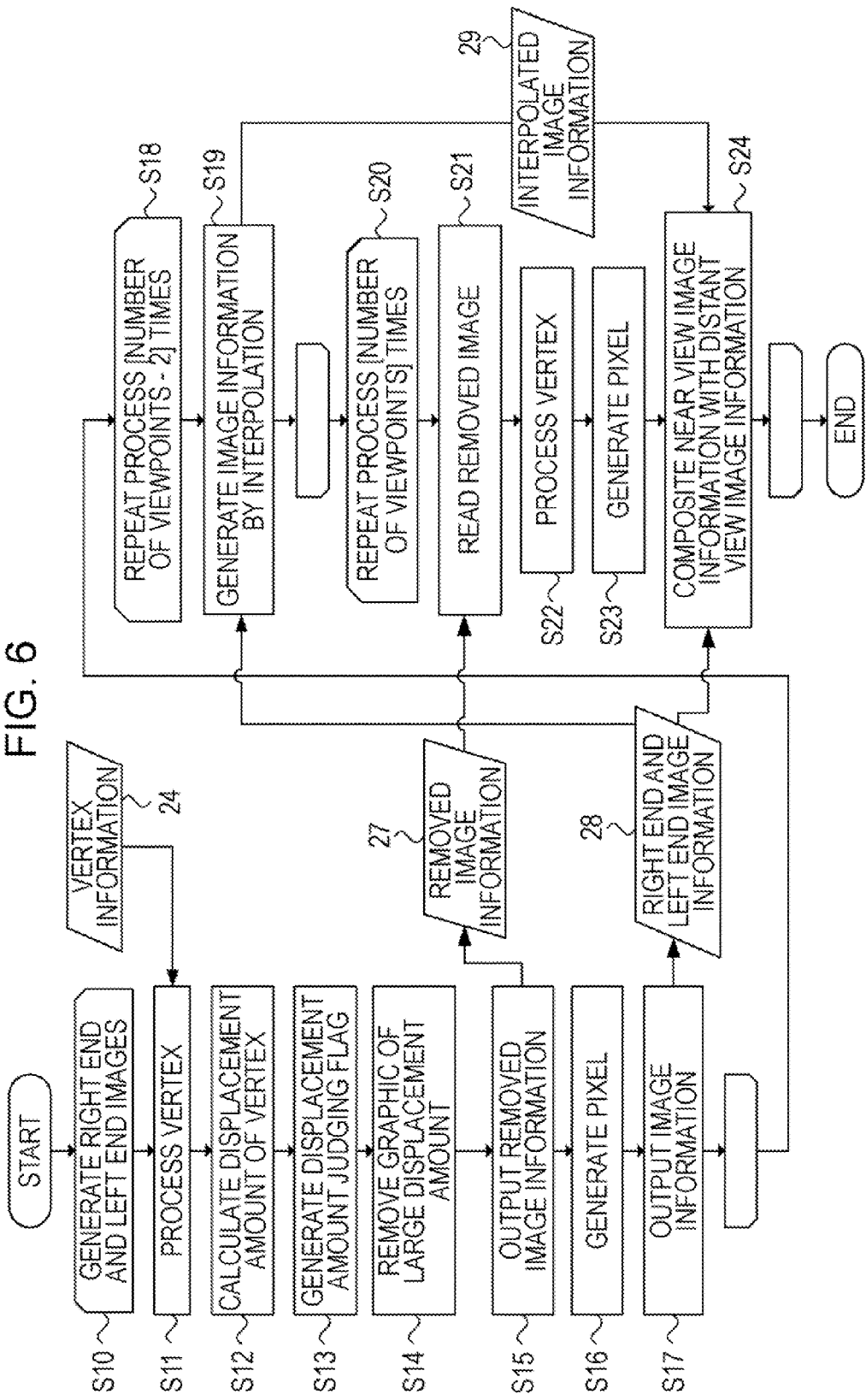
FIG. 6 is a diagram illustrating an example of one detailed flowchart of an image generating process.

FIG. 6 is a diagram illustrating an example of a detailed flowchart of an image generating process. The flowchart in FIG. 6 is executed using the CPU 11. The CPU 11 generates a distant view two-dimensional image, generates a near view two-dimensional image and then composites these two two-dimensional images with each other.

The CPU 11 generates the right end and left end image information 28 by executing processes from step S11 to step S17 (S10). The CPU 11 reads the vertex information 24 included in the image information 30 out of the memory 12 and executes the vertex processing means 21 (S11). The vertex processing means 21 performs coordinate transformation on the read vertex information 24 on the image of the three-dimensional coordinate system to generate an image of the two-dimensional coordinate system which has been projected onto the display screen from the left end or right end viewpoint. The vertex processing means 21 generates the depth information on each of vertexes of polygons included in the image which has been transformed to the image of the two-dimensional coordinate system.

The CPU 11 executes the image dividing means 20 on each of vertexes of polygons included in the image which has been transformed to the image of the two-dimensional coordinate system to calculate the displacement amount of the vertex (S12). The displacement amount D of each vertex may be calculated from an equation $D=C/W$ wherein W denotes depth information and C denotes a constant. The longer the distance of each vertex from the display screen is, the deeper the depth information W is. Thus, the value of the vertex displacement amount D of each of vertexes of polygons included in the near view image is larger than that of each of vertexes of polygons included in the distant view image. Although, in the embodiment, the vertex displacement amount is used as the reference in order to divide the solid image into the near view image and the distant view image, the depth information may be used as the reference.

The CPU 11 generates a displacement amount judging flag for each vertex using the image dividing means 20 (S13). The image dividing means 20 calculates the vertex displacement amount D of each vertex and compares it with a previously set threshold value DTH. In the case that the vertex displacement amount D of each vertex is larger than the threshold value DTH, the image dividing means 20 sets the value of the displacement amount judging flag to "1". In the case that the displacement amount D is smaller than the threshold value DTH, the image dividing means 20 sets the value of the displacement amount judging flag to "0". The displacement amount judging flag is stored as part of the vertex information.

As described above, the three-dimensional image in the above mentioned embodiment may be an aggregate of polygons. The image dividing means 20 reads information on vertexes which may define each of the polygons included in the image concerned. In the case that the value of the displacement amount judging flag which is included in the read vertex information as the flag of at least one of the vertexes of each of the polygons is "1", the image dividing means 20 removes the polygon as a graphic of a large displacement amount (S14). The CPU 11 outputs all the graphics to be removed as the removed image information 27 to the memory 12 (S15). The removed mage information 27 may be, for example, index information which is stored such that the vertex information on each of the vertexes which may define each polygon to be removed may be referred to. In the above mentioned case, the removed image information 27 is image information on the near view image.

The CPU 11 executes a pixel generating process on image information obtained after execution of the removing process using the pixel generating means 22 (S16). In the above mentioned case, the image information obtained after execution of the removing process is image information on the distant view image. The CPU 11 outputs the right end and left end image information 28 which has been generated using the image generating means 22 to the memory 12.

The CPU 11 repeats execution of the process at step S19 [the number of viewpoints—2] times to calculate an interpolated image obtained at each viewpoint (S18). At step S18, the right end viewpoint and the left end viewpoint are included in the number of viewpoints. Thus, in the case that the interpolated image which is obtained at one viewpoint between the right end and left end viewpoints is calculated, the number of times that the CPU 11 repeats execution of the process at step S19 is one.

The CPU 11 executes the pixel interpolating means 23 at step S19. The pixel interpolating means 23 executes interpolation arithmetic processing on the interpolated image information 29 on the image which has been projected onto the display screen from an arbitrary viewpoint. The pixel interpolating means 23 executes interpolation arithmetic processing also on the depth information on each vertex.

The CPU 11 repeats execution of processes from step S21 to step S24 [the number of viewpoints] times (S20). The CPU 11 repeats execution of the processes to composite the distant view and near view two-dimensional images which have been projected onto the display screen from the respective viewpoints with each other.

The CPU 11 reads the removed image information 27 stored in the memory 12 (S21). The CPU 11 reads the vertex information included in the removed image information 27 in order to generate the two-dimensional images which have been projected onto the display screen from respective viewpoints. The CPU 11 executes a process of coordinate transformation to the two-dimensional images which have been projected onto the display screen from the respective viewpoints on the read vertex information using the vertex processing means 21 (S22). The vertex processing means 21 calculates the depth information of each vertex and outputs it to the memory 12.

In this embodiment, the vertex processing means 21 also generates a removed image which has been projected onto the display screen from each viewpoint other than the right end and left end viewpoints. Load on the CPU may be reduced by executing the vertex processing only on the removed image information 27 in compassion with a case in which the vertex processing is executed on all pieces of image information.

A two-dimensional image for the near view image which has been regarded as a removed image may be generated by performing interpolation arithmetic processing as in the case in the two-dimensional image for the distant view image. The CPU 11 is allowed to generate the removed image which has been projected onto the display screen from each viewpoint with arithmetic load which is smaller than that exerted in execution of the vertex processing by generating the two-dimensional image by interpolation arithmetic processing.

The CPU 11 generates pixel information on the respective vertexes and the plane surrounded by the vertexes with respect to the removed image which has been projected onto the display screen from each viewpoint (S23).

The CPU 11 composites the information on the near view images which have been projected onto the display screen from the respective viewpoints with the image information on the distant area images which have been projected onto the display screen from the respective viewpoints in units of viewpoints (S24). The CPU 11 executes the compositing process on the basis of the depth information of vertexes of polygons included in each image using the image compositing means 25. The near view two-dimensional image and the distant view two-dimensional image may be generated with accuracy by executing the compositing process on the basis of the depth information.

As described above, a solid image is divided into distant view image and near view image, interpolated images for the distant and near views are separately generated, and then the interpolated images are composited with each other on the basis of depth information. Owing to execution of the above mentioned processing, regardless of presence of a part which will be in the dead angle when observed from both of two viewpoints, it is allowed to generate with accuracy a two-dimensional image which has been projected onto the display screen from a viewpoint other than the above two viewpoints by interpolation arithmetic processing executed using the two-dimensional images which have been projected onto the display screen from the above mentioned two viewpoints.

In addition, even in the case that a plurality of dead angles are present, it may be allowed to generate an accurate two-dimensional image by dividing the solid image into image parts on the basis of the distance from each viewpoint to each position where each dead angle is present and respectively obtaining respective interpolated images for the divided image parts of the solid image.

Figure 7:
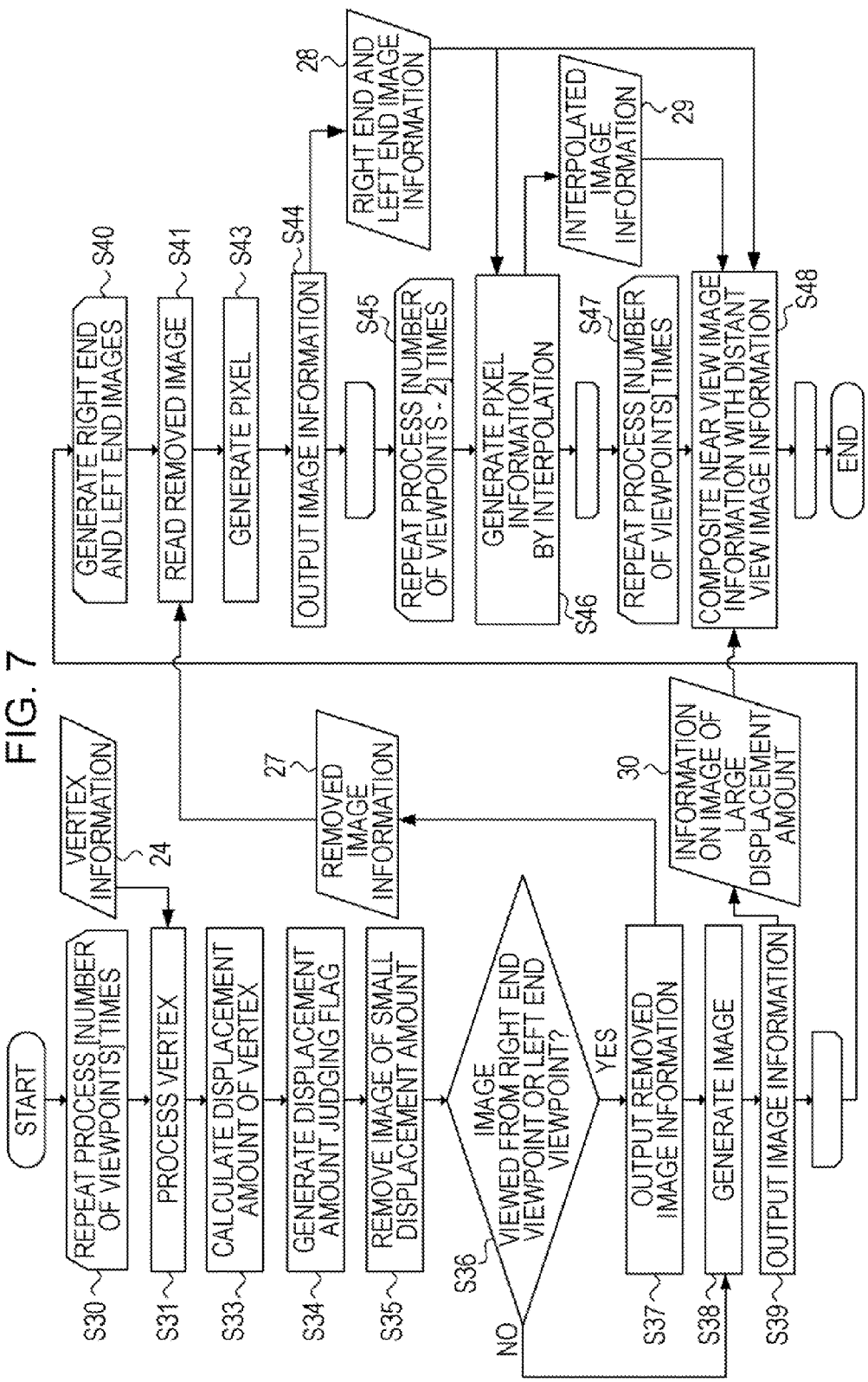
FIG. 7 is a diagram illustrating an example of another detailed flowchart of an image generating process.

FIG. 7 is a diagram illustrating an example of another detailed flowchart of the image generating process. The flowchart in FIG. 7 is executed using the CPU 11. The CPU 11 generates a near view two-dimensional image, thereafter generates a distant view two-dimensional image and then composites the above mentioned two two-dimensional images with each other.

The CPU 11 repeats execution of the processes from step S31 to step S39 [the number of viewpoints] times to generate the near view two-dimensional image projected from each viewpoint (S30). Incidentally, the right end viewpoint and the left end viewpoint are also included in the above mentioned number of viewpoints.

Then, the CPU 11 reads the vertex information 24 out of the memory 12 and executes the vertex processing means 21 (S31). The vertex processing means 21 performs coordinate transformation on the read vertex information 24 of the three-dimensional coordinate system to generate the image of the two-dimensional coordinate system which has been projected onto the display screen from each viewpoint. The vertex processing means 21 generates depth information on each of vertexes of polygons included in the image which has been transformed to the image of the two-dimensional coordinate system.

The CPU 11 executes the image dividing means 20 on each of the vertexes of polygons included in the image which has been transformed to the image of the two-dimensional coordinate system to calculate the displacement amount of each vertex (S33). The method of calculating the vertex displacement amount D of each vertex is as described above.

Then, the CPU 11 generates the displacement amount judging flag for each vertex using the image dividing means 20 (S34). The method of determining the displacement amount judging flag is as described above.

The image dividing means 20 reads vertex information on each of vertexes of respective polygons included in the three-dimensional image. In the case that the value of at least one of the read displacement amount judging flags of the vertexes which may define each polygon is "0", the image dividing means 20 regards the image which includes the polygon concerned as the image of a small displacement amount and removes it (S35).

The CPU 11 judges whether the in-process viewpoint is the right end or left end viewpoint (S36). In the case that the in-process viewpoint is the right end or left end viewpoint (S36: YES), the CPU 11 outputs the image information on the removed near view image part as the removed image information 27 to the memory 12 (S37). The removed image information 27 may be, for example, index information which stores vertex information on the vertexes which may define the polygon included in the image to be removed. In the above mentioned case, the removed image information 27 is image information on the distant view image.

In the case that the in-process viewpoint is not the right end viewpoint or the left end viewpoint (S36: NO), the CPU 11 executes the pixel generating process on the image information obtained after execution of the image removing process using the pixel generating means 22 (S38). In the above mentioned case, the image information obtained after execution of the image removing process is image information on the near view image. The CPU 11 outputs the image information which has been generated using the pixel generating means 22 to the memory 20 as the image information 30 of a large displacement amount (S39).

The CPU 11 repeats execution of the processes from step S41 to step S44 on the images which have been projected from the right end and left end viewpoints (S40). By repeating execution of the processes, the CPU 11 is allowed to generate the two-dimensional images which have been projected onto the display screen from the right end and left end viewpoints with respect to the removed image information 27.

Then, the CPU 11 reads the removed image information 27 out of the memory 12 (S41). The CPU 11 executes the pixel generating process on the removed image information 27 so read using the pixel generating means 22 (S43). In the above mentioned case, the removed image information 27 is image information on the near view image. The CPU outputs the right end and left end image information 28 on the near view image which has been generated using the pixel generating means 22 to the memory 12 (S44).

The CPU 11 repeats execution of the process at step S46 [the number of viewpoints—2] times (S45). The CPU 11 executes the pixel interpolating means 23 at step S46. The pixel interpolating means 23 performs interpolation arithmetic processing on the interpolated image information 29 on the near view image which has been projected onto the display screen from an arbitrary viewpoint on the basis of the right end and left end image information 28 on the near view image which has been output to the memory 12. The pixel interpolating means 23 also performs interpolation arithmetic processing on the depth information on each vertex.

The CPU 11 repeats execution of the process at step S48 [the number of viewpoints] times (S47). The CPU 11 composites distant view and near view two-dimensional images which have been projected onto the display screen from the respective viewpoints with each other using the image compositing means 25 (S48). The CPU 11 executes the compositing process on the basis of the depth information on each of vertexes of polygons included in each image. By performing the compositing process on the basis of the depth information, it is allowed to generate the accurate two-dimensional image from the near view two-dimensional image and the distant view two-dimensional image.

As described above, the solid image is divided into the distant view and near view images, interpolated images of the distant view and the near view are separated generated, and then the interpolated images are composited with each other on the basis of the depth information. Owing to execution of the above mentioned processing, regardless of presence of a part which will be in the dead angle from both of two viewpoints, it is allowed to generate with accuracy the two-dimensional image which has been projected onto the display screen from a viewpoint other than the above two viewpoints by interpolation arithmetic processing executed using two-dimensional images which have been projected onto the display screen from the above two viewpoints. Incidentally, it is allowed to composite the distant view and near view images with each other with accuracy by using the depth information regardless of which image is processed first after the solid image has been divided into the distant view and rear view images.

Figure 8:
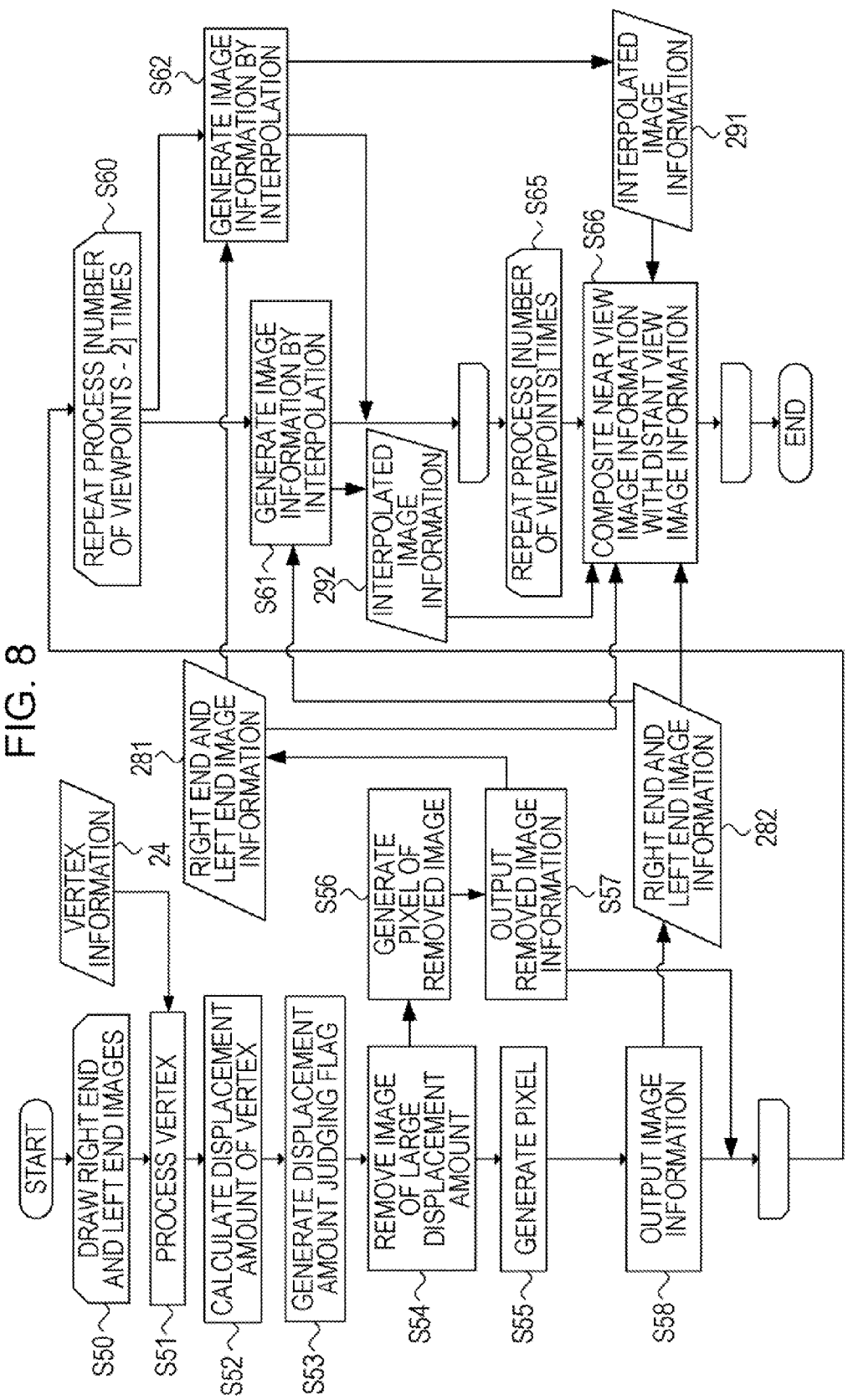
FIG. 8 is a diagram illustrating an example of a further detailed flowchart of an image generating process.

FIG. 8 is a diagram illustrating an example of a further detailed flowchart of the image generating process. The flowchart in FIG. 8 is executed using the CPU 11. The CPU 11 divides a solid image into two groups of distant view and near view images, thereafter separately generates distant view and near view two-dimensional images and then composites the generated two two-dimensional images with each other. In this embodiment, the CPU 11 may be a multi-processor which may execute in parallel processes of projecting the near view and distant view images simultaneously.

The CPU 11 generates right end and left end image information 281 on the near view image and right end and left end image information 282 on the distant view image by executing the processes from step S51 to step S58 (S50). The CPU 11 reads the vertex information 24 out of the memory 12 to execute the vertex processing means 21 (S51). The vertex processing means 21 performs coordinate transformation on the read vertex information 24 of the image of the three-dimensional coordinate system and generates the image of the two-dimensional coordinate system which has been projected onto the display screen from the left end or right end viewpoint. The vertex processing means 21 generates depth information on each of vertexes of polygons included in the image which has been coordinate-transformed to the two-dimensional coordinate system.

The CPU 11 executes the image dividing means 20 on each of vertexes of polygons included in the image so transformed to the two-dimensional coordinate system and calculates the vertex displacement amount of each vertex (S52). The CPU 11 generates the displacement amount judging flag for each vertex using the image dividing means 20 (S53). The CPU 11 removes the image of a large displacement amount on the basis of the displacement amount flag so generated (S54). In the above mentioned case, the image including the polygon vertex of the large displacement amount is the near view image.

The CPU 11 executes the pixel generating process on the image information obtained after execution of the image removing process using the pixel generating means 22 (S55). In the above mentioned case, the image information obtained after execution of the image removing process is the distant view image information. The CPU 11 outputs the right end and left end image information 282 on the distant view image which has been generated using the pixel generating means 22 to the memory 12 (S58).

The CPU 11 executes the pixel generating process on the removed image information using the pixel generating means 22 in parallel with execution of image processing on the distant view image (S56). In the above mentioned case, the removed image information is image information on the near view image. The CPU 11 outputs the right end and left end image information 281 on the near view image which has been generated using the pixel generating means 22 to the memory 12 (S57).

The CPU 11 repeats execution of the process from step S61 to step S63 [the number of viewpoints—2] times (S60). The CPU 11 performs interpolation arithmetic processing on interpolated image information 292 which has been projected onto the display screen from an arbitrary viewpoint using the pixel interpolating means 23 on the basis of the right end and left end image information 282 on the distant view image which has been output to the memory 12 (S61). The pixel interpolating means 23 performs interpolation arithmetic processing also on the depth information on each vertex.

The CPU executes interpolation arithmetic processing on the near view image using the pixel interpolating means 23 in parallel with execution of the image processing on the distant view image (S62). The CPU 11 executes interpolation arithmetic processing on interpolated image information 291 on the interpolated image which has been projected onto the display screen from an arbitrary viewpoint on the basis of the right end and left end image information 281 on the near view image which has been read out of the memory 12 (S62). The pixel interpolating means 23 performs interpolation arithmetic processing also on the depth information on each vertex included in the interpolated image information 291.

The CPU 11 repeats execution of the process at step S66 [the number of viewpoints] times (S65). The CPU 11 composites the distant view and near view two-dimensional images which have been separately projected onto the display screen from respective viewpoints with each other (S66). The CPU 11 executes the compositing process on the basis of the depth information on each of vertexes of polygons included in each image using the image compositing means 25. With respect to the right end and left end viewpoints, the CPU 11 composites the near view right end and left end image information 281 and the distant view right end and left end image information 282 with each other. In addition, with respect to a viewpoint other than the right end and left end viewpoints, the CPU 11 composites the near view interpolated image information 291 and the distant view interpolated image information 292 with each other. By executing the compositing process on the basis of the depth information, the compositing process may be executed with accuracy with no change in relation between the near view two-dimensional image and the distant view two-dimensional image with respect to the distance from each viewpoint.

As described above, a solid image is divided into two groups of distant view and near view images, interpolated images of the distant view and near view images are separately generated and then the interpolated images are composited with each other on the basis of depth information. Owing to execution of the above mentioned processing, regardless of presence of a part which will be in the dead angle when observed from both of two viewpoints, it is allowed to generate with accuracy a two-dimensional image which has been projected onto the display screen from a viewpoint other than the above two viewpoints by interpolation arithmetic processing executed using two-dimensional images which have been projected onto the display screen from the above two viewpoints. In addition, efficient generation of the two-dimensional image is allowed by performing a process of generating a distant view two-dimensional image and a process of generating a near view two-dimensional image in parallel with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. An image generating method, executed by an image generator, for generating a projected two-dimensional image of a three-dimensional image seen from a view point located in a coordinate system including the three-dimensional image, the three-dimensional image being stored in a storage, the image generating method comprising:

generating, by the image generator, first and second projected two-dimensional images of a front object seen from first and second viewpoints, the front object being a part of the three-dimensional image divided by a predetermined boundary surface;

interpolating, by the image generator, the first and second projected two-dimensional images to generate a first interpolated two-dimensional image of the front object seen from a third viewpoint locating on a straight line connecting the first and second viewpoint;

generating, by the image generator, third and fourth projected two-dimensional images of a rear object seen from the first and second viewpoints, the rear object being another part of the three-dimensional image divided by the predetermined boundary surface;

interpolating, by the image generator, the third and fourth projected two-dimensional images to generate a second interpolated two-dimensional image of the rear object seen from the third viewpoint; and generating a composite image by overwriting the first interpolated two-dimensional image on the second interpolated two-dimensional image by the image generator, the composite image being based on each of the first and second two dimensional images of the front object, the first interpolated two-dimensional image, the third and fourth projected two-dimensional images of the rear object, and the second interpolated two-dimensional image, wherein the front object and the rear object are statically arranged with respect to each of other and the generation of the composite image prevents an omission of a part of the rear object within the composite image from occurring when the part of the rear object is in a dead angle from both the first and second viewpoints.

2. The image generating method according to claim 1, wherein the three-dimensional image is defined by a plurality of polygons, the polygon is defined by positional information on vertexes, in a case that one of the vertexes of the polygon is situated in front of the predetermined boundary surface, the polygon is regarded to be situated in the front of the predetermined boundary surface, in a case that all the vertexes of the polygon are situated in the rear of the predetermined boundary surface, the polygon is regarded to be situated in the rear of the predetermined boundary surface, the front object is a set of polygons situated in front of the predetermined boundary surface, and the rear object is a set of polygons situated in the rear of the predetermined boundary surface.

3. The image generating method according to claim 2, wherein vertex information of the two-dimensional image includes depth information for indicating distance from the viewpoint to the vertex of three-dimensional image.

4. The image generating method according to claim 2, wherein the boundary surface is a plane along which all the vertexes of the plurality of mutually adjacent polygons are divided to be positioned either in the front or at the rear of the predetermined boundary surface.

5. An image generator comprising:
a storage that stores a three-dimensional image; and
a processor configured to generate a projected two-dimensional image of the three-dimensional image seen from a view point located in a coordinate system including the three-dimensional image, wherein the processor executes a plurality of instructions, the instructions comprising:

generating first and second projected two-dimensional images of a front object seen from first and second viewpoints, the front object being a part of the three-dimensional image divided by a predetermined boundary surface;

interpolating the first and second projected two-dimensional images to generate a first interpolated two-dimensional image of the front object seen from a third viewpoint locating on a straight line connecting the first and second viewpoint;

generating third and fourth projected two-dimensional images of a rear object seen from the first and second viewpoints, the rear object being another part of the three-dimensional image divided by the predetermined boundary surface;

interpolating the third and fourth projected two-dimensional images to generate a second interpolated two-dimensional image of the rear object seen from the third viewpoint; and generating a composite image by overwriting the first interpolated two-dimensional image on the second interpolated two-dimensional image, the composite image being based on each of the first and second two dimensional images of the front object, the first interpolated two-dimensional image, the third and fourth projected two-dimensional images of the rear object, and the second interpolated two-dimensional image, wherein the front object and the rear object are statically arranged with respect to each of other and the generation of the composite image prevents an omission of a part of the rear object within the composite image from occurring when the part of the rear object is in a dead angle from both the first and second viewpoints.

6. The image generator according to claim 5, wherein the three-dimensional image is defined by a plurality of polygons, the polygon is defined by positional information on vertexes, in a case that one of the vertexes of the polygon is situated in front of the predetermined boundary surface, the polygon is regarded to be situated in the front of the predetermined boundary surface, in a case that all the vertexes of the polygon are situated in the rear of the predetermined boundary surface, the polygon is regarded to be situated in the rear of the predetermined boundary surface, the front object is a set of polygons situated in front of the predetermined boundary surface, and the rear object is a set of polygons situated in the rear of the predetermined boundary surface.

7. A non-transitory computer-readable storage medium with an executable program stored therein, wherein the program instructs a microprocessor to perform:

storing a three-dimensional image;

generating first and second projected two-dimensional images of a front object seen from first and second viewpoints located in a coordinate system including the three-dimensional image, the front object being a part of the three-dimensional image divided by a predetermined boundary surface;

interpolating the first and second projected two-dimensional images to generate a first interpolated two-dimensional image of the front object seen from a third viewpoint locating on a straight line connecting the first and second viewpoint;

generating third and fourth projected two-dimensional images of a rear object seen from the first and second viewpoints, the rear object being another part of the three-dimensional image divided by the predetermined boundary surface;

interpolating the third and fourth projected two-dimensional images to generate a second interpolated two-dimensional image of the rear object seen from the third viewpoint; and generating a composite image by overwriting the first interpolated two-dimensional image on the second interpolated two-dimensional image, the composite image being based on each of the first and second two dimensional images of the front object, the first interpolated two-dimensional image, the third and fourth projected two-dimensional images of the rear object, and the second interpolated two-dimensional image, wherein the front object and the rear object are statically arranged with respect to each of other and the generation of the composite image prevents an omission of a part of the rear object within the composite image from occurring when the part of the rear object is in a dead angle from both the first and second viewpoints.

8. The non-transitory computer-readable storage medium according to claim 7, wherein the three-dimensional image is defined by a plurality of polygons, the polygon is defined by positional information on vertexes, in a case that one of the vertexes of the polygon is situated in front of the predetermined boundary surface, the polygon is regarded to be situated in the front of the predetermined boundary surface, in a case that all the vertexes of the polygon are situated in the rear of the predetermined boundary surface, the polygon is regarded to be situated in the rear of the predetermined boundary surface, the front object is a set of polygons situated in front of the predetermined boundary surface, and the rear object is a set of polygons situated in the rear of the predetermined boundary surface.

* * * * *